(12) United States Patent
Ojala et al.

(10) Patent No.: US 8,559,381 B2
(45) Date of Patent: Oct. 15, 2013

(54) METHOD, APPARATUS AND COMPUTER PROGRAM TO MAP A DOWNLINK RESOURCE TO A RELATED UPLINK TRANSMISSION

(75) Inventors: Jussi Ojala, Helsinki (FI); Frank Frederiksen, Klarup (DK); Esa Malkamaki, Espoo (FI)

(73) Assignee: Nokia Corporation, Espoo (FI)

( * ) Notice: Subject to any disclaimer, the term of this patent is extended or adjusted under 35 U.S.C. 154(b) by 374 days.

(21) Appl. No.: 12/349,683

(22) Filed: Jan. 7, 2009

(65) Prior Publication Data

US 2009/0175233 A1 Jul. 9, 2009

Related U.S. Application Data

(60) Provisional application No. 61/010,354, filed on Jan. 7, 2008.

(51) Int. Cl.
*H04W 4/00* (2009.01)

(52) U.S. Cl.
USPC .......................................................... 370/329

(58) Field of Classification Search
USPC .......... 370/310–350, 431–463; 455/450–455, 455/509–514
See application file for complete search history.

(56) References Cited

U.S. PATENT DOCUMENTS

| | | | |
|---|---|---|---|
| 2002/0055360 A1* | 5/2002 | Chen et al. ..................... | 455/452 |
| 2007/0110004 A1* | 5/2007 | Liu et al. ....................... | 370/335 |
| 2008/0205348 A1* | 8/2008 | Malladi ......................... | 370/335 |
| 2008/0274747 A1* | 11/2008 | Ludwig et al. ................ | 455/450 |

FOREIGN PATENT DOCUMENTS

| | | |
|---|---|---|
| JP | 2009540626 A | 11/2009 |
| WO | WO 2007/141643 A1 | 12/2007 |

OTHER PUBLICATIONS

Chiang et al, Adaptive Downlink/Uplink Bandwidth Allocation in IEEE 802.16 (WiMAX) Wireless Networks: A Cross-Layer Approach, Jan. 11, 2007.*
"PHICH Assignment in E-UTRA", 3GPP TSG RAN1 #51, R1-074588, Nov. 2007, 3 pgs.
"MU-MIMO PHICH Assignment for Adaptive and non-Adaptive HARQ", 3GPP TSG RAN1 #50, R1-073409, Aug. 2007, 4 pgs.
"$3^{rd}$ Generation Partnership Project; Technical Specification Group Radio Access Network; Evolved Universal Terrestrial Radio Access (E-UTRA); Physical Channels and Modulation (Release 8)", 3GPP TS 36.211 V8.1.0 (Nov. 2007), pp. 1-5 and 25-50 (Section 6).
Chih-He Chiang et al, "Adaptive Downlink/Uplink Bandwith Allocation in IEEE 802.16 (Wi MAX) Wireless Networks: A Cross-Layer Approach", IEE GLOBECOM 2007 proceedings.

* cited by examiner

*Primary Examiner* — Ricky Ngo
*Assistant Examiner* — Wei-Po Kao
(74) *Attorney, Agent, or Firm* — Harrington & Smith

(57) ABSTRACT

A predetermined parameter is used to determine a rate of uplink radio resources to downlink radio resources. Then an uplink radio resource is mapped to a unique one of the downlink radio resources dependent at least in part on the rate. There is then received on the mapped unique one of the downlink radio resources a reply to the uplink radio resource. Apparatus and computer programs are also described, for both a user equipment and a network node.

32 Claims, 3 Drawing Sheets

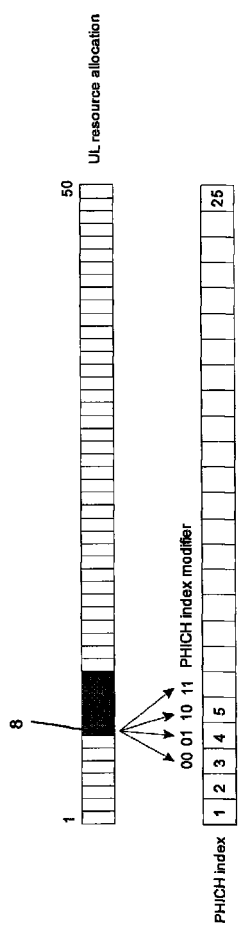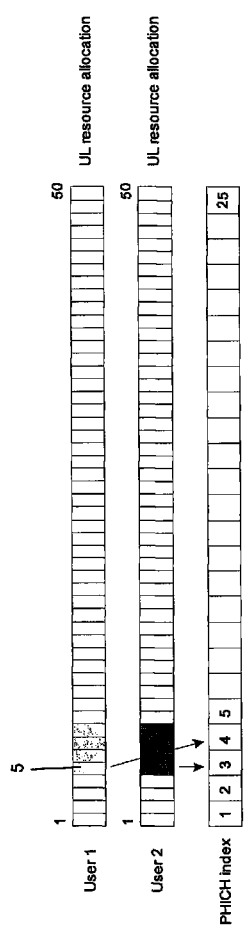

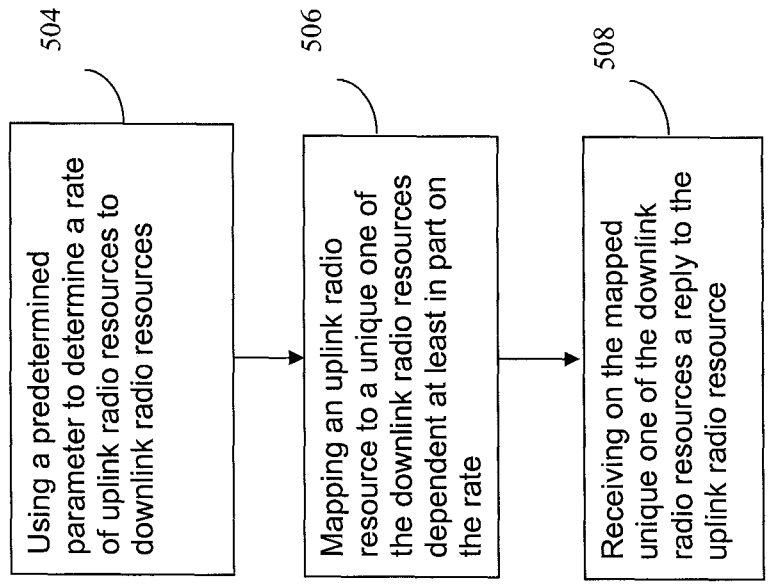

METHOD, APPARATUS AND COMPUTER PROGRAM TO MAP A DOWNLINK RESOURCE TO A RELATED UPLINK TRANSMISSION

CROSS REFERENCE TO RELATED APPLICATION

This patent application claims priority under 35 U.S.C. §119(e) from U.S. Provisional Patent Application No. 61/010,354,: filed Jan. 7, 2008, which is incorporated by reference herein in its entirety.

TECHNICAL FIELD

The teachings herein relate generally to wireless networks that employ an ACK/NACK protocol, particularly where the ACK/NACK is sent on one channel that must then be mapped to find the data to which the ACK/NACK refers.

BACKGROUND

The following abbreviations are used in the description below:
3GPP third generation partnership project
ACK/NACK acknowledgement/negative acknowledgement
CSI cyclic shift index
DL downlink
DM RS demodulation reference symbols
e-NodeB Node B of an E-UTRAN system
E-UTRAN evolved UTRAN
H-ARQ hybrid automatic repeat request
LTE long term evolution of 3GPP
MU-MIMO multi-user multiple input/multiple output
Node B base station or similar network access node, including e-NodeB
PBCH physical broadcast channel
PDCCH physical downlink control channel
PHICH physical H-ARQ indicator channel
PMI precoding matrix indicator
PRB physical resource block
UE user equipment (e.g., mobile equipment/station)
UL uplink
UMTS universal mobile telecommunications system
UTRAN UMTS terrestrial radio access network 3GPP is standardizing the long-term evolution (LTE) of the radio-access technology which aims to achieve reduced latency, higher user data rates, improved system capacity and coverage, and reduced cost for the operator. As with any fundamental re-design of a wireless protocol, changing one aspect as compared to an earlier generation system leads to redesign of other portions of the system in order to maximize the advantages to be gained. Specifically, LTE employs the concept of the e-NodeB scheduling its own radio resources within the cell, which gives more flexibility to put available resources to use and also reduces latency in addressing uplink and downlink needs of the various user equipments in the cell. Its most flexible form is dynamic scheduling, where a single scheduling grant sent on a shared control channel grants to one particular user equipment one particular amount of physical resources. This amount of physical resources is constructed of a number of uplink physical resource blocks. The Node B (or its surrogate in the case of relay stations) then must send an ACK or NACK as appropriate to the user equipment once that granted set of UL PRBs passes so the UE can know whether or not it must re-transmit its UL data. LTE sends the ACK/NACK for data received in the UL direction on a special channel (PHICH). The ACK/NACK on the PHICH is made compatible with dynamic scheduling by mapping the UL resource granted to the UE to the particular PHICH where the ACK/NACK is to be, and the development of LTE has seen various proposals for specifics of that mapping.

In general, the HARQ concept includes a forward error detection through CRC (cyclic redundancy check), a feedback channel for ACK/NACK, and a retransmission mechanism.

So for the case of UL transmission with H-ARQ in LTE, the e-NodeB will transmit the acknowledgement (ACK/NACK) for the UL transmission (at least in case of non-adaptive HARQ) on the PHICH channel. The eNode-B will transmit in the same time the ACK/NACK that is possible for several UEs UL transmissions. The UE needs to know which of those ACKs/NACKs transmitted in the PHICH channel correspond to the UE's own UL transmission.

While dynamic scheduling was noted above, LTE currently aims at using two ways of allocating resources for initial transmission (persistent and dynamic scheduling). As a special case of dynamic allocations, multi user MIMO (MU-MIMO) might be used where the same uplink transmission resources are allocated to two or more users at the same time. For the H-ARQ retransmissions, LTE allows two different ways of allocating resources—either as dynamic scheduling as non-adaptive H-ARQ. It should be noted that the e-Node B might be configured to use only a subset of these options.

One possible solution is shown in a paper designated R1-074588, entitled "PHICH Assignment in E-UTRA" (3GPP TSG RAN1 #51, Jeju, Korea, Nov. 5-9, 2007, by Motorola). R1-074588 describes that for dynamic scheduling (transmission assigned with scheduling grant), the UEs are divided to one or more groups and for each UE group a PHICH group is assigned.

Under current understanding in LTE, a PHICH group consists of physical resources that can at maximum carry 8 ACKs/NACKs in the case where a short cyclic prefix is used; for a long cyclic prefix the number might be less. The UE knows the ACK/NACK resources inside the PHICH group from the CSI of the DM RS, which is signaled to the UE in its UL grant for the corresponding UL transmission. The CSI of the signaled DMRS (or the n_DMRS) can be used to change or identify the PHICH offset as well as the PHICH group (see definitions in section 9.1.2 of 3GPP TS 36.213). This CSI is 3-bits and with these bits the exact ACK/NACK inside the PHICH group can be identified.

This previous approach is also applied for the MU-MIMO case (assigned with scheduling grant). In the MU-MIMO case, two users at different channel conditions are assigned to the same physical (time/frequency) resources and their transmissions can be decoded in the e-NodeB due to those different channel conditions (e.g. different physical locations). To be able to decode MU-MIMO transmissions, separate channel estimations for the two UL transmissions need to be done in the e-NodeB to enable that e-NodeB to have different CSI for both MU-MIMO users.

In the case of non-adaptive HARQ or persistent allocation, the PHICH resources are derived from the used PRBs (e.g., the first PRB index of the allocated UL resources indicates which ACK/NACK resource to use. This can be in any PHICH group. This imposes some scheduling restrictions for the UEs scheduled in the MU-MIMO case and in the dynamic scheduling cases.

The UE needs to know implicitly the PHICH resources in the DL to search for the ACK or NACK that will match its UL transmission, independently of whether the UL transmission is a normal transmission with an allocation grant, a semi-persistent transmission without an allocation grant, or a MU-MIMO or non-adaptive re-transmission.

Reference R1-074588 is extended by reference R1-073409, entitled "MU-MIMO PHICH Assignment for Adaptive and non-Adaptive HARQ" (3GPP TSG RAN1 #50, Athens, Greece, Aug. 20-24, 2007, by Motorola). The MU-MIMO solution in R1-073409 in combination with that of reference R1-074588 gives a more comprehensive solution, but it is more complex and uses more resources than the inventors see as necessary. Moreover, one of the drawbacks of the solution is that it requires grouping of UEs to PHICH groups. This needs additional signaling and introduces restrictions to the scheduler in the e-NodeB in that the scheduler needs to check that only a limited number of UEs from the same PHICH group are scheduled in the same TTI, the limitation being that the maximum number of PHICH in one PHICH group (either 4 or 8 in current understanding of this aspect of LTE).

Other proposals also exists in 3GPP to map the PHICH resource to the UL resource it ACKs or NACKs, however they are seen to address only a subset of the problem rather than all the different UL transmission possibilities that must be ACK'd or NACK'd as laid out above. What is needed in the art is a comprehensive solution to map a UL resource to a DL resource on which the ACK/NACK for that UL resource is sent, regardless of whether the UL resource was dynamically allocated, semi-persistent, or MU-MIMO. Such as solution should be very low in signaling overhead since it will be repeated so often in a practical system.

SUMMARY

According to an exemplary embodiment there is a method which includes using a predetermined parameter to determine a ratio of uplink radio resources to downlink radio resources; mapping an uplink radio resource to a unique one of the downlink radio resources dependent at least in part on the ratio, wherein the uplink radio resource is a resource over which the apparatus sends its transmission and the downlink radio resource is a resource for acknowledging the transmission over the uplink radio resource; and receiving on the mapped unique one of the downlink radio resources a reply to the uplink radio resource.

According to another exemplary embodiment there is an apparatus comprising a memory storing a predetermined parameter; a processor configured to determine a ratio of uplink radio resources to downlink radio resources; and the processor further configured to map an uplink radio resource to a unique one of the downlink radio resources dependent at least in part on the ratio, wherein the uplink radio resource is a resource over which the apparatus sends its transmission and the downlink radio resource is a resource for acknowledging the transmission over the uplink radio resource.

According to another exemplary embodiment there is an apparatus comprising memory means for storing a predetermined parameter; and processing means for determining a ratio of uplink radio resources to downlink radio resources and further for mapping an uplink radio resource to a unique one of the downlink radio resources in dependence at least in part on the ratio, wherein the uplink radio resource is a resource over which the apparatus sends its transmission and the downlink radio resource is a resource for transmitting a reply to a transmission sent over the uplink radio resource.

According to another exemplary embodiment there is a memory embodying a program of machine-readable instructions, executable by a digital data processor, to perform actions directed to map a downlink radio resource to a related uplink radio resource. The actions comprise: using a predetermined parameter to determine a ratio of uplink radio resources to downlink radio resources; and mapping an uplink radio resource to a unique one of the downlink radio resources dependent at least in part on the ratio, wherein the uplink radio resource is a resource over which the apparatus sends its transmission and the downlink radio resource is a resource for transmitting a reply to a transmission sent over the uplink radio resource.

According to another exemplary embodiment there is a method that comprises receiving a transmission from a user equipment on an uplink radio resource; using a predetermined parameter to determine a ratio of uplink radio resources to downlink radio resources; mapping the uplink radio resource to a unique one of the downlink radio resources dependent at least in part on the ratio, wherein the uplink radio resource is a resource over which the apparatus sends its transmission and the downlink radio resource is a resource for transmitting a reply to a transmission sent over the uplink radio resource; and sending on the mapped unique one of the downlink radio resources a reply to the transmission received on the uplink radio resource.

According to another exemplary embodiment there is an apparatus that comprises a receiver configured to receive a transmission from a user equipment on an uplink radio resource; a memory storing a predetermined parameter; a processor configured to determine a ratio of uplink radio resources to downlink radio resources; and the processor further configured to map the uplink radio resource to a unique one of the downlink radio resources dependent at least in part on the ratio, wherein the uplink radio resource is a resource over which the apparatus sends its transmission and the downlink radio resource is a resource for transmitting a reply to a transmission sent over the uplink radio resource.

According to another exemplary embodiment there is an apparatus that comprises receive means for receiving a transmission from a user equipment on an uplink radio resource; memory means for storing a predetermined parameter; and processing means for determining a ratio of uplink radio resources to downlink radio resources, and further for mapping the uplink radio resource to a unique one of the downlink radio resources in dependence at least in part on the ratio, wherein the uplink radio resource is a resource over which the apparatus sends its transmission and the downlink radio resource is a resource for transmitting a reply to a transmission sent over the uplink radio resource.

According to another exemplary embodiment there is a memory embodying a program of machine-readable instructions, executable by a digital data processor, to perform actions directed to map a downlink radio resource to a related uplink radio resource. The actions comprise using a predetermined parameter to determine a ratio of uplink radio resources to downlink radio resources; and mapping an uplink radio resource to a unique one of the downlink radio resources dependent at least in part on the ratio, wherein the uplink radio resource is a resource over which the apparatus sends its transmission and the downlink radio resource is a resource for transmitting a reply to a transmission sent over the uplink radio resource.

BRIEF DESCRIPTION OF THE DRAWINGS

The foregoing and other aspects of these teachings are made more evident in the following Detailed Description, when read in conjunction with the attached Drawing Figures.

FIG. 3 is a mapping diagram between PRB and PHICH illustrating, for the embodiment of the second row of FIG. 2, a second element of the invention which uses a second parameter to shift the PHICH index mapped according to the first parameter to the PRB index.

FIG. 4 is a mapping diagram between PRB and PHICH showing how the second parameter of FIG. 3 can be used to map two users allocated the same MU-MIMO UL PRB to different PHICH resources.

FIG. 5 is a flow chart illustrating an exemplary embodiment of the invention.

DETAILED DESCRIPTION

Embodiments of this invention relate to mapping or assigning a PHICH resource, which is a DL resource, to a UL radio resource over which the UE sent its transmission. The two are related in that the ACK/NACK may be considered generally as a reply to the UE's transmission on the UL resource. In general, these teachings detail a mapping functionality that creates a relation between uplink resource allocations and the associated downlink PHICH resources. As will be detailed in a particular embodiment, the mapping functionality includes two important elements: (a) a cell-specific down sampling parameter, and (b) a PHICH offset adjustment functionality. The former may be transmitted by the e-NodeB on a broadcast channel and the latter may be transmitted to a particular UE by the e-NodeB using explicit signaling.

Figure 1:
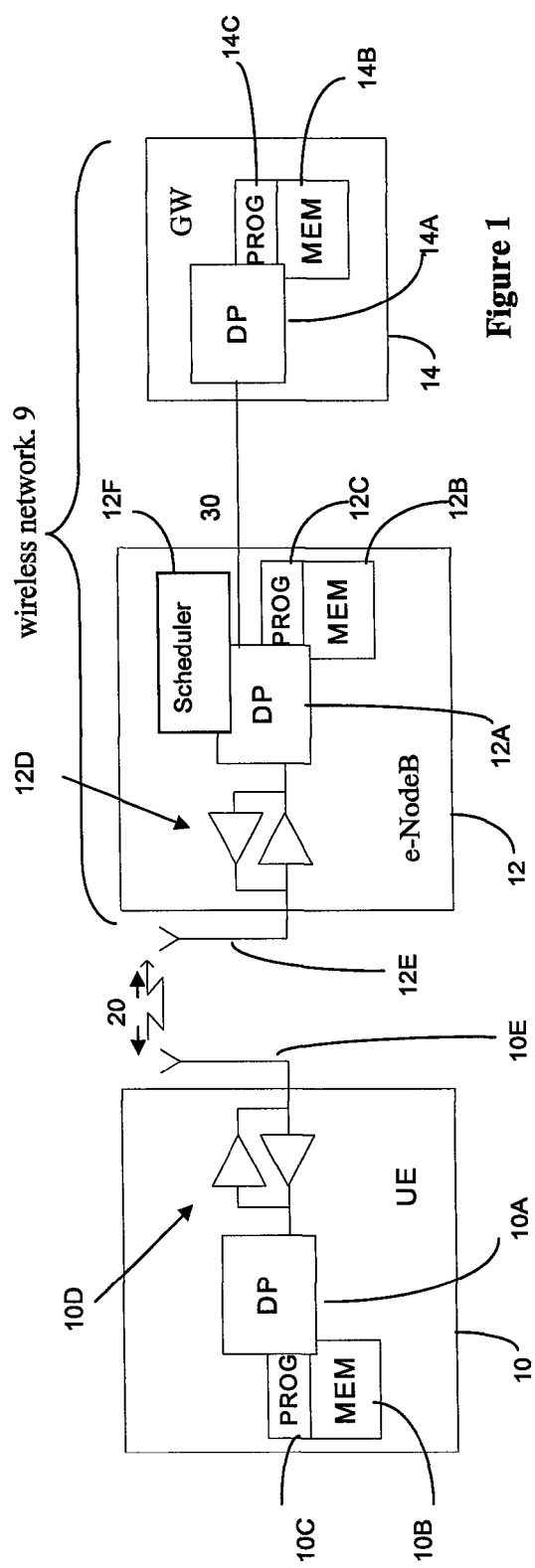
FIG. 1 shows a simplified block diagram of various electronic devices that are suitable for use in practicing the exemplary embodiments of this invention.

As a preliminary matter before exploring details of various implementations, reference is made to FIG. 1 for illustrating a simplified block diagram of various electronic devices that are suitable for use in practicing the exemplary embodiments of this invention. In FIG. 1 a wireless network 9 is adapted for communication between a UE 10 and a Node B 12 (e.g., a wireless access node, such as a base station or particularly an e-NodeB for a LTE system). The network 9 may include a gateway GW/serving mobility entity MME/radio network controller RNC 14 or other radio controller function known by various terms in different wireless communication systems. The UE 10 includes a data processor (DP) 10A, a memory (MEM) 10B that stores a program (PROG) 10C, and a suitable radio frequency (RF) transceiver 10D coupled to one or more antennas 10E (one shown) for bidirectional wireless communications over one or more wireless links 20 with the Node B 12. The wireless links 20 represent in the particular embodiments described the various channels PDCCH, PHICH, PBCH and the like. For the case of MU-MIMO, the UEs 10 being allocated on the MU-MIMO basis may have more than one antenna 10E.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The e-NodeB 12 also includes a DP 12A, a MEM 12B, that stores a PROG 12C, and a suitable RF transceiver 12D coupled to one or more antennas 12E. The e-NodeB 12 may be coupled via a data path 30 (e.g., Iub or S1 interface) to the serving or other GW/MME/RNC 14. The GW/MME/RNC 14 includes a DP 14A, a MEM 14B that stores a PROG 14C, and a suitable modem and/or transceiver (not shown) for communication with the Node B 12 over the Iub link 30.

Also within the e-NodeB 12 is a scheduler 12F that schedules the various UEs under its control for the various UL and DL radio resources. Once scheduled, the e-NodeB sends messages to the UEs with the scheduling grants (typically multiplexing grants for multiple UEs in one message). These grants are sent over particular channels such as the PDCCH in LTE. Generally, the e-NodeB 12 of an LTE system is fairly autonomous in its scheduling and need not coordinate with the GW/MME 14 excepting during handover of one of its UEs to another Node B.

At least one of the PROGs 10C, 12C and 14C is assumed to include program instructions that, when executed by the associated DP, enable the electronic device to operate in accordance with the exemplary embodiments of this invention, as detailed above. Inherent in the DPs 10A, 12A, and 14A is a clock to enable synchronism among the various apparatus for transmissions and receptions within the appropriate time intervals and slots required, as the scheduling grants and the granted resources/subframes are time dependent. The transceivers 10D, 12D include both transmitter and receiver, and inherent in each is a modulator/demodulator commonly known as a modem. The DPs 12A, 14A also are assumed to each include a modem to facilitate communication over the (hardwire) link 30 between the e-NodeB 12 and the GW 14.

The PROGs 10C, 12C, 14C may be embodied in software, firmware and/or hardware, as is appropriate. In general, the exemplary embodiments of this invention may be implemented by computer software stored in the MEM 10B and executable by the DP 10A of the UE 10 and similar for the other MEM 12B and DP 12A of the e-NodeB 12, or by hardware, or by a combination of software and/or firmware and hardware in any or all of the devices shown.

In general, the various embodiments of the UE 10 can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

Figure 2:
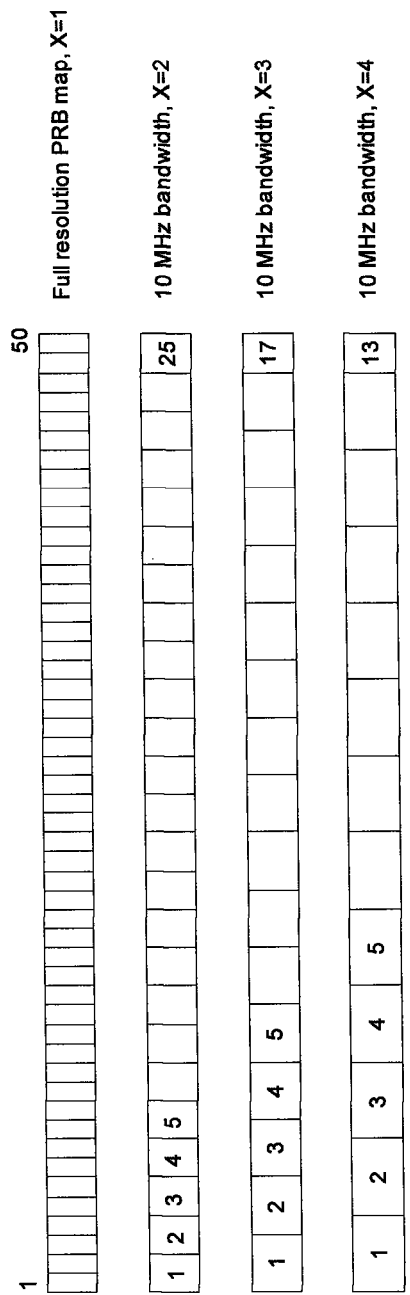
FIG. 2 is a PHICH resource map illustrating in four embodiments a first element of the invention for mapping PRB index to PHICH index according to a first parameter X.

Now are described particular embodiments of the invention in detail. First is described with particularity the relation between physical uplink resource allocations, those radio resources over which the UE 10 sends its UL data transmissions, and the PHICH resources over which the e-NodeB 12 sends its ACK/NACK replies to those UL transmissions informing the UE either that the UL transmission was successfully received or not. Four distinct examples are shown in FIG. 2, each assuming a 10 MHz system bandwidth case as an example. Other options for system bandwidths are easily derived from this 10 MHz example. FIG. 2 illustrates the principle of creating a relation between the uplink resource allocation and the corresponding downlink PHICH index. It should be noted that the numbers shown at FIG. 2 are only indicative. For example, it might be preferable to have 24 PHICH channels as opposed to the illustrated 25 PHICH channels in the second row since in LTE PHICH resources are created in multiples of 8.

Assume that for this 10 MHz bandwidth case there are 50 physical resource blocks which the e-NodeB has at its discretion available to allocate to various UEs. Recognize that at least for the time division multiplexing aspects of LTE, those 50 PRBs are all reserved for UL allocations, though for any given set of 50 PRBs some of them might not be allocated to any UE depending on traffic conditions. The first row of FIG. 2, denoted "Full Resolution PRB map, X=1", shows that for this 10 MHz bandwidth case there are 50 PHICH resources, so there will be a one-to-one mapping between the 50 PRBs available for allocation to the UEs and the 50 PHICH resources available for ACKing/NACKing those allocated PRBs. The PHICH resources can be considered more generically as DL resources. For simplicity, use an index 1-50 for the PRBs which will potentially be allocated to a UE for its UL transmission, and a similar index beginning at 1 for the PHICH resources. The index can be modified to begin at zero, but for this explanation assume it begins at 1.

Above were mentioned briefly that certain embodiments of the invention incorporate two important elements. For the first of those elements, the UE is provided with a cell-specific down sampling parameter which will indicate the number of PHICH resources matched against the number of PRBs in the system bandwidth. This parameter is represented herein as "X", and is also referred to as a predetermined first parameter. It is predetermined because it is signaled from the e-NodeB 12 to the UE 10 prior to the time that it is needed, and stored in the memory 10B, 12B of each.

The two prior art references noted in background constrain the UEs to a UE group and map PHICH resources by group to the individual UE groups, and then use three bits to indicate which PHICH within the designated groups matches a particular UL transmission from the a particular UE. In a particular embodiment, the first element of this invention uses two bits to set the value of the predetermined first parameter X and sends it on a broadcast channel, so X can take on four distinct values {00, 01, 10, 11}, which are shown as the four rows of FIG. 2. This results in the following mapping rule based on two bits on the PBCH which indicates the PHICH resource. In truth, the parameter X indicates a down sampling rate rather than the actual amount of resources, because this embodiment also uses the system bandwidth to determine the actual mapping. So the rows of FIG. 2 correspond to the indicated values of the parameter X as follows:

X=1, approximately every PRB is mapped to a unique PHICH resource

X=2, approximately every second PRB is mapped to a unique PHICH resource

X=3, approximately every third PRB is mapped to a unique PHICH resource

X=4, approximately every fourth PRB is mapped to a unique PHICH resource

The details of the mapping rule depend slightly on the bandwidth. The PHICH resources are given in PHICH groups, in which there are "Y" resources per PHICH group. For the case of a long CP this is either 4 or 8 PHICH resources per group. Thus the granularity of the given PHICH resources are a multiple of the term Y. It should be noted that the above down sampling values are merely examples, and other values could be used (e.g., 1, 2, 4, 8). It is noted that the current 3GPP specifications stipulate the factors ½, 1, 2, 6, meaning that for factor ½, one PRB is mapped to two PHICH resources (to allow for extensive use of MU-MIMO). Embodiments of this invention may use those same down sampling values for the meaning of the two-bit first parameter X.

From this there will be one mapping between the available PRBs and the potential PHICH resources. Note that not all available PRBs must be allocated to the UEs. For the case where more than half of the 50 PRBs are in fact allocated to UEs for UL transmissions, then the e-NodeB 12 would set X=1 and there would be a one to one mapping of PRB to PHICH resource. For the case where less than half the PRBs are allocated to the UEs for UL transmissions, then there is no need for 50 PHICH resources and the e-NodeB can flexibly adapt the number of PHICH resources to match, by varying the parameter X as shown above and at the second through fourth rows of FIG. 2. More important here is the number of UEs having a simultaneous allocation: if there are only a few UEs allocated, then larger X can be utilized whereas when very many UEs are allocated with a small allocation for each, then a smaller X is required such that all UEs can be assigned a PHICH resource.

Not every PRB of the 50 available PRBs maps to a unique PHICH resource, except where X=1. For the second row of FIG. 2, every other PRB which the e-NodeB 12 has available to allocate to the UEs for UL transmissions maps to a PHICH resource. For the third row of FIG. 2, every third PRB which the e-NodeB 12 has available to allocate to the UEs for UL transmissions maps to a PHICH resource. For the fourth row of FIG. 2, every fourth PRB which the e-NodeB 12 has available to allocate to the UEs for UL transmissions maps to a PHICH resource. Thus, there is no necessity to group the UEs into UE groups to match the PHICH resource groups, which gives the e-NodeB much more flexibility as to which PRB it allocates to any individual UE. Because the rate of available PRB to PHICH resource is dependent on the bandwidth, the mapping is not exactly every second or third or fourth PRB to a PHICH resource, but the 'edges' or borders of the PRB bandwidth can be tailored to avoid PRB mapping so as to make the determined rate a simple integer as will be seen below.

For simplicity, the PRB index of the first allocated PRB is described as mapping or referring to the corresponding PHICH index of the potential PHICH resource. Exemplary index numbers for the PHICH resources are shown in each row of FIG. 2. The actual PHICH resource that relates to the PRB allocated for the UE's UL transmission can be further changed according to the second element noted above, which is termed a PHICH index modifier (a second predetermined parameter), which is detailed further below. But limiting for now the discussion to the first element, the parameter X, and the simple index matching noted immediately above, we have the following basic principle to map PRB to PHICH according to index numbers:

$$PHICH\_index = \lfloor PRB\_index1/X \rfloor, \qquad [1]$$

where PRB_index1 is the lowest PRB index allocated to a given UE. Equation [1] above may also be modified slightly to multiply the PHICH index by a scaling factor.

It may be too limiting to constrain the e-NodeB 12 to allocate for each UE's UL transmissions only every other or every third or every fourth PRB, which is where the second element of the invention becomes valuable. For example, the e-NodeB 12 may choose for efficiency reasons to allocate to one UE PRB index number 10 and to a second UE PRB index number 11, while the parameter X is set to 2. Using only the first element of the invention detailed above would map one of those PRBs to a unique PHICH resource but the same would not be true of the other PRB. Where there are persistent allocations (e.g., for voice-over Internet protocol VoIP communications), this would serve as a fairly constraining limitation to the e-NodeB scheduler 12F. For cases where multiple PRB allocations might be assigned to the same PHICH index, embodiments of this invention provide a predetermined second parameter, the PHICH index modifier.

The principle of the PHICH index modifier is shown by example in FIG. 3, which assumes X=2 since there are 25 PHICH resources in the bottom row for the 50 PRB resources available to the e-NodeB scheduler 12F in the top row. FIG. 3 shows generally the principle of using a PHICH index modifier, which gives the option of performing a shift of the implicitly given PHICH index. Such a feature might be useful when considering for instance multi-user MIMO or when having uplink allocations of varying sizes—especially uplink allocations of small sizes.

Using only the parameter X to map PRB to PHICH, the PRB with index 8 would map to PHICH with index 4. But in the top row of FIG. 3 the e-NodeB scheduler 12F allocates (by whatever manner, dynamic, semi-persistent, etc) each of the shaded PRBs for UL resources to one or more UEs. PRBs for the PRB indices 8 through 12 must each have a unique PHICH resource over which the e-NodeB 12 can send a corresponding ACK or NACK. As seen at FIG. 3, the PHICH index modifier is (in this embodiment) a two-bit signal that tells how much and what direction to shift the PHICH index from that which maps to the PRB index using the first parameter X. Two bits enable the mapping of PRB index to PHICH index to be shifted to any of four PHICH resources rather than only the single PHICH index given by mapping with only the first parameter X. This is shown particularly for PRB index 8 mapping potentially to any of PHICH indices 3 through 6, and the same shifting can be done for each of the other PRB indices 9-12 of FIG. 3. By selectively shifting the mapping in this manner, each of the PRB indices 8-12 at the top row of FIG. 3 can map to a unique PHICH resource at the bottom row of FIG. 3.

In a particular embodiment, other payload information is utilized to indicate to a UE that an offset should be applied to the PHICH index that is implicitly given by the parameter X. One such piece of payload information could be PMI or CSI information fields from the PDCCH payload for the uplink allocations themselves. In the example in FIG. 3, it is assumed that 2 bits are available but more bits can be used to give a greater variance to the index shift. Using the two-bit example of FIG. 3 as an example, the PHICH index modifier may be interpreted to modify the PHICH index (which is mapped by the first parameter X) for example:

PHICH index modifier=00: Reduce value of PHICH index by 1

PHICH index modifier=01: Keep value of PHICH index

PHICH index modifier=10: Increase value of PHICH index by 1

PHICH index modifier=11: Increase value of PHICH index by 2

The edges of the mapping can be addressed by a simple wrap-around functionality, such that if an allocated PHICH index is 25 (see FIG. 3) and the PHICH index modifier is to increase the value of the PHICH index by one, then the allocated PHICH index is (25+1) mod 25=1, which is the first PHICH index of the next sequential set of PHICH resources. Alternatively, a saturation function may be employed, such that in the above case, the modifiers are automatically adjusted such that at maximum they can address the maximum PHICH index. Given the above specific case of PHICH index of 25, the modifier becomes:

PHICH index modifier=00: Reduce value of PHICH index by 3

PHICH index modifier=01: Reduce value of PHICH index by 2

PHICH index modifier=10: Reduce value of PHICH index by 1

PHICH index modifier=11: Keep value of PHICH index

A similar approach could also be applied for the PHICH index value of 1.

The PHICH index modifier approach works equally well for the case of MU-MIMO. Consider an example of multi-user MIMO in uplink, where two users might be assigned to the same physical resources, and thereby potentially to the same PHICH index. This situation is shown in FIG. 4, which assumes the same 50 PRBs available for allocation, X=2 so there are 25 PHICH resources for mapping, and both user 1 (a first UE) and user 2 (a second UE) are allocated a PRB for UL transmission with index=5. The PHICH index modifier is sent to each of user 1 and user 2 separately such as in the payload of their MU-MIMO allocation, so each can be sent by the e-NodeB 12 a different bit sequence for the PHICH index modifier and each offsets the mapping done only by the parameter X by a different value (or one does not offset at all, such as where PHICH index modifier=01 in the above example of how those bits are interpreted). So as shown in FIG. 4, user 1 maps PRB index 5 to PHICH index 4 and user 2 maps PRB index 5 to PHICH index 3. FIG. 4 is considered a special allocation case, multiple user MIMO in the uplink. For such a case where two users share the same physical resources, the PHICH modifier is used to shift a user's allocation to a free PHICH resource An advantage of the above teachings is that this is seen to be a much simpler solution than the prior art detailed in background above, and is seen to use less than (or at least no more than) the amount of control channel resources for mapping the PHICH.

Above it was noted that the 'edges' of the bandwidth are addressed by not using the last one or two PRBs for UL allocations, so as to keep the mapping of PRB to PHICH indices even and result in a rate that is a positive integer. So for example in the third or fourth rows of FIG. 2 the e-NodeB scheduler 12F would not allocate for UL transmissions the last two PRBs of the 50-PRB set. Another example for a 10 MHz bandwidth system is to take the possibility that each PHICH group has 8 PHICH resources, and then the granularity of PHICH resources could be also 8 (other granularities are possible but not as spectrally efficient). Then the maximum number of PHICH resources could be 48 for a 50-PRB set and the outermost PRB would be left without direct implicit PHICH resource mapping. Then using an offset denoted by the integer "a" to accommodate the borders, equation [1] would be changed to:

$$PHICH\_index = \lfloor (PRB\_index1 - a)/X \rfloor, \quad [2]$$

where PRB_index1 is the lowest PRB index allocated to a given UE. For the case where 48 of the 50 PRBs map to a PHICH resource, the variable "a" of equation [2] would be one since one PRB at each border is reserved for PUCCH and does not map to a PHICH. For the case where 40 of the 50 PRBs map to a PHICH resource (keeping with PHICH groupings of 8), the variable "a" would be 5 since one PRB at each border is reserved for PUCCH and does not map to a PHICH. Equation [2] is readily adaptable for any number of PRBs in the set and any equal or lesser number of PHICH resources to which they map.

Then the four different options for X (still assuming only two bits for signaling X) but using the 8-PHICH resource grouping could in an exemplary embodiment be as follows:

X=1: 6 PHICH groups (two PRBs without PHICH mapping) for a total of 48 ACK/NACK resources.
  The outermost PRBs can be left without PHICH mapping, since they are for control channel.
  Each of 48 PRBs maps to a unique PHICH resource.
X=2: 3 PHICH groups for a total of 24 ACK/NACK resources (every second with some small exceptions)
  The outermost PRBs can be left without PHICH mapping, since they are for control channel.
  Every second PRB maps to a unique PHICH resource.
X=3, 2 PHICH groups for a total of 16 ACK/NACK resources (every third with some small exceptions)
  The outermost PRBs can be left without PHICH mapping, since they are for control channel.
  Every third PRB maps to a unique PHICH resource.
X=6, 1 PHICH group for a total of 8 ACK/NACK resources (every sixth with some small exceptions)
  The outermost PRBs can be left without PHICH mapping, since they are for control channel.
  Every sixth PRB maps to a unique PHICH resource.

So in summary, the PHICH indexing and mapping detailed above is based on the actual allocated physical uplink transmission resources (the PRB index). In a simple approach to the mapping, the lowest PRB index will map into a PHICH channel index. Compared to the approaches of references R1-074588 and R1-073409 noted in background above, the mapping detailed herein is even simpler and requires little book-keeping, as each UE 10 will know its own resource allocation, and thereby the corresponding PHICH resource. The solution presented herein gives the advantages of a very simple mapping mechanism between physical resource grant and PHICH index, and it readily supports persistent allocations, as each persistent allocation still refers to physical resources. Compression techniques are recommended so that the required amount of PHICH resources scale directly with the number of PRBs (a high number of PHICH resources might be needed in some embodiments). Multi-user UL MIMO allocations will refer to the same physical resources, and thereby to the same PHICH resources, but collisions may be avoided by the embodiments above that use the PHICH index modifier.

There are four pieces of information available to the UE by which to calculate the number of PHICH channels. They are: number of PHICH groups (which by example is indicated on the PBCH via 2 bits); PHICH duration (which by example may also be indicated on the PBCH via one bit); the number of PRBs for UL transmission; and the number of PHICH channels per PHICH group. Respecting the number of PRBs for UL transmission, this number may potentially exclude the resources reserved for packet uplink control channel PUCCH to optimize the amount of resources reserved for PHICH, which can be known by each of the UEs also. In the current understanding of LTE this can take the value from 6 to 100 (or 110) depending on the used system bandwidth, and in the specific examples above was set to 50 (or 48 with one PRB at each edge reserved for PUCCH and not used in the PHICH mapping). For simplicity, denote this value as $N_{PRB}$. The number of PHICH channels per PHICH group (which under current understanding of LTE is either 4 or 8), is denoted as $N_g$. The parameter X, or $X_{size}$, denotes the value of the PHICH size, which can basically take the values from 1 to 4 in the example above.

Associating the PRB index to the PHICH index scales the actual amount of PHICH channels by the value of $X_{size}$. Thus, the number of PHICH channels is defined as:

$$N_{PHICH,c} = ceil(N_{PRB}/X_{size}), \quad [3]$$

where the ceil operation rounds towards +infinity.
The number of PHICH groups is defined as:

$$N_{PHICH,g} = ceil(N_{PHICH,c}/N_g). \quad [4]$$

Equation [3] is similar to equation [1] above but using slightly different variable names; equation [4] uses PHICH groups such as for the examples noted above for 8-PHICH resource grouping. Following this, the network operator (e-NodeB) has a way of adjusting the PHICH overhead by choosing/defining the value of $X_{size}$. This principle is shown at FIG. 2; adjusting the value of $X_{size}$ for the 10 MHz case enables the e-NodeB to adjust the size of the PHICH. However, since the compression (less than a one-to-one mapping) will cause adjacent PRBs to refer to the same PHICH resource, the PHICH index modifier concept is used so that the cyclic shifts for the DM RS can be used to indicate an offset relative to the actual PHICH channel index. This is shown in FIG. 3, which denotes the DM RS index as a PHICH index modifier. If the CSI is 3 bits then, e.g., the most significant bit can be used as PHICH index modifier if only two values are needed, or e.g., two most significant bits can be used as PHICH index modifier if four values are needed, or the complete CSI can be used as the PHICH index modifier if eight values are needed.

For persistent allocation where a UE is given an allocation that can be used once every PS_PERIOD (periodicity of persistent scheduling, e.g., 20 ms in the case of VoIP traffic), the PHICH resource is derived in the same ways as described above: first X is used to determine the grouping of PRBs and PHICH index modifier is utilized to modify the index if needed. X is broadcasted and the number of PHICH resources/groups can be derived (or alternatively if the number of PHICH resources or the number of PHICH groups is broadcasted, then X may be derived from the number of PHICH resources) and the PHICH index modifier is sent on PDCCH. In case of persistent allocation, PHICH index modifier is sent when the persistent allocation is done (either in the same way as for dynamic scheduling, e.g., in the form of CSI sent on PDCCH; or it can be sent also as medium access control MAC signaling if the persistent allocation is done via MAC signaling) and the same PHICH index modifier can be used throughout the persistent allocation. The e-NodeB scheduler knows which PHICH resources are being used by the persistent UEs and when scheduling other UEs dynamically, the e-NodeB can assign them different PHICH resources by using the PHICH index modifier (provided that the PRB mapping would give the same PHICH resource as used by a persistently allocated UE).

Non-adaptive retransmissions are also sent without PDCCH allocation. They use the same resources as the previous allocated transmission. The PHICH resource to be used to acknowledge a non-adaptive retransmission should be the same as used for the previous allocated transmission (typically the initial transmission). At the same time dynamically scheduled transmissions can be indicated to use a different PHICH resource with the aid of the PHICH index modifier.

From the above description it is apparent that embodiments of this invention include an apparatus such as a portable user equipment, a computer program embodied on a memory that may be disposed in the user equipment, and a method by which the user equipment transmits on an uplink radio resource, then using a predetermined parameter the user equipment determines a rate of radio resources (of which the uplink radio resource is a part) to downlink resources. Using that rate, the user equipment then maps the uplink radio resource to a unique one of the downlink radio resources, and receives on the mapped unique one of the downlink resources a reply to the uplink radio resource.

In particular embodiments any of the various following aspects may be implemented singularly or in any combination with the embodiments described immediately above for the user equipment: the predetermined parameter X is signalled on a broadcast channel using two bits; the rate is either of one, two, three or four radio resources per downlink radio resource; and the downlink radio resources are on a PHICH, the radio resources are physical resource blocks PRBs, and the reply is one of an acknowledgement of receipt of the transmission or a negative acknowledgement of receipt of the transmission. According to a specific embodiment using the index offset as detailed above, the parameter is a first parameter (e.g., X as detailed above) and the user equipment maps the uplink radio resource to the unique one of the downlink radio resources by first mapping the uplink radio resource to a PHICH resource using the first parameter and thereafter determines the unique one of the downlink radio resources by offsetting from the PHICH resource by an amount determined from a second parameter (e.g., PHICH index modifier as detailed above), where that second parameter may be no more than two bits and received by the user equipment on a control channel such as the PDCCH. In a particular embodiment detailed above, the predetermined first parameter is X, the uplink resource is identified by an index "PRB_index", the downlink resource is identified by an index "PHICH index", and the predetermined second index is "PHICH index modifier". For this particular embodiment then, the mapping finds the PHICH index by either PHICH index=$\lfloor PRB\_index1/X \rfloor$ or $\lfloor (PRB\_index1-a)/X \rfloor$, where operator $\lfloor\ \rfloor$ indicates a flooring operation and the latter equation is used for the case where the total number of radio resources divided by the number of downlink radio resources is not an integer. The variable "a" in the latter equation is a positive integer to account for the borders. The PHICH index modifier is then used to step from the PHICH index by the amount indicated by the predetermined second parameter. In an embodiment, the PHICH index modifier is signaled as a cyclic shift of a demodulation reference signal that the UE receives with an uplink resource allocation.

Similarly from the Node B's perspective, embodiments of this invention include an apparatus such as a network element (e.g., Node B), a computer program embodied on a memory that may be disposed in the network element, and a method by which the network element receives a transmission from a user equipment on an uplink radio resource, and using a predetermined parameter the network element determines a rate of radio resources (of which the uplink radio resource is a part) to downlink resources. Using that rate, the network element then maps the uplink radio resource to a unique one of the downlink radio resources, and sends to the user equipment on the mapped unique one of the downlink resources a reply to the uplink radio resource.

In particular embodiments any of the various following aspects may be implemented singularly or in any combination with the embodiments described immediately above for the network element: the network element signals the predetermined parameter X on a broadcast channel using two bits; the rate is either of two, three or four radio resources per downlink radio resource; and the downlink radio resources are on a PHICH, the radio resources are physical resource blocks PRBs, and the reply is one of an acknowledgement of receipt of the transmission or a negative acknowledgement of receipt of the transmission. According to a specific embodiment using the index offset as detailed above, the parameter is a first parameter (e.g., X as detailed above) and the network element maps the uplink radio resource to the unique one of the downlink radio resources by first mapping the uplink radio resource to a PHICH resource using the first parameter and thereafter determines the unique one of the downlink radio resources by offsetting from the PHICH resource by an amount determined from a second parameter (e.g., PHICH index modifier as detailed above), where that second parameter may be no more than two bits and sent by the network element to the user equipment on a control channel such as the PDCCH. In a particular embodiment detailed above, the predetermined first parameter is X, the uplink resource is identified by an index "PRB_index", the downlink resource is identified by an index "PHICH index", and the predetermined second index is "PHICH index modifier". For this particular embodiment then, the mapping finds the PHICH index by either PHICH index=$\lfloor PRB\_index1/X \rfloor$ or $\lfloor (PRB\_index1-a)/X \rfloor$, where operator $\lfloor\ \rfloor$ indicates a flooring operation and the latter equation is used for the case where the total number of radio resources divided by the number of downlink radio resources is not an integer. The variable "a" in the latter equation is a positive integer to account for the borders. The PHICH index modifier is then used to step from the PHICH index by the amount indicated by the predetermined second parameter. In an embodiment, the PHICH index modifier is signaled as a cyclic shift of a demodulation reference signal that the e-NodeB sends to the UE with an uplink resource allocation.

For the aspects of this invention related to network, embodiments of this invention may be implemented by computer software executable by a data processor of the Node B 12, such as the processor 12A shown, or by hardware, or by a combination of software and hardware. For the aspects of this invention related to user equipment, embodiments of this invention may be implemented by computer software executable by a data processor of the UE 10, such as the processor 10A shown, or by hardware, or by a combination of software and hardware. Further in this regard it should be noted that the various logical step descriptions above may represent program steps, or interconnected logic circuits, blocks and functions, or a combination of program steps and logic circuits, blocks and functions.

FIG. 5 illustrates an operation of an exemplary embodiment of the invention. A method according to this exemplary embodiment may include using a predetermined parameter to determine a rate of uplink radio resources to downlink radio resources 504. Mapping an uplink radio resource to a unique one of the downlink radio resources dependent at least in part on the rate 506, and receiving on the mapped unique one of the downlink radio resources a reply to the uplink radio resource 508.

In general, the various embodiments may be implemented in hardware or special purpose circuits, software (computer readable instructions embodied on a computer readable medium), logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope of the invention as set forth above, or from the scope of the ensuing claims.

What is claimed is:

1. A method comprising:
using a predetermined parameter to determine by an apparatus a ratio of uplink radio resources to downlink radio resources;
mapping an uplink radio resource to a unique one of the downlink radio resources dependent at least in part on the ratio, wherein the uplink radio resource is a resource over which the apparatus sends its transmission and the unique one of the downlink radio resources is a resource for transmitting a reply to the transmission sent over the uplink radio resource, and wherein mapping the uplink radio resource to a unique one of the downlink radio resources comprises determining an index of a downlink physical hybrid automatic repeat request indicator channel based at least in part on a physical resource block index of the transmission sent over the uplink radio resource and on the ratio; and
receiving on the mapped unique one of the downlink radio resources a reply to an uplink transmission on the uplink radio resource, wherein the reply informs whether or not the uplink transmission on the uplink radio resource was successfully received.

2. The method of claim 1, wherein the predetermined parameter is received on a broadcast channel using two bits.

3. The method of claim 1, wherein the downlink radio resources are physical resource blocks on a physical hybrid automatic repeat request indicator channel and the reply is one of an acknowledgement or a negative acknowledgement.

4. The method of claim 1, wherein the predetermined parameter comprises a first parameter and mapping the uplink radio resource to the unique one of the downlink radio resources comprises:
mapping the uplink radio resource to a physical hybrid automatic repeat request indicator channel resource using the first parameter; and
thereafter determining the unique one of the downlink radio resources by offsetting from the physical hybrid automatic repeat request indicator channel resource by an amount determined from a second parameter that is received on a control channel.

5. The method of claim 4, wherein if the first parameter is X and the uplink resource is indicated as an index to a physical resource block, then mapping comprises indentifying the hybrid automatic repeat request indicator channel resource as:
$\lfloor PRB\_index1/X \rfloor$ for the case where the total number of uplink radio resources divided by the number of downlink radio resources is an integer; or
$\lfloor (PRB\_index1-a)/X \rfloor$ for the case where the total number of uplink radio resources divided by the number of downlink radio resources is not an integer and the term "a" is a positive integer to make the equation an integer, wherein the operator $\lfloor \ \rfloor$ indicates a flooring operation, and wherein PRB_index1 indicates the lowest physical resource block index allocated to a given user equipment.

6. The method of claim 4, wherein the second parameter comprises a cyclic shift of a demodulation reference symbol that is received with an uplink resource allocation on the control channel.

7. The method of claim 4, where the second parameter comprises an index modifier, where the index modifier is used for mapping the uplink radio resource.

8. An apparatus comprising:
a memory storing program instructions; and
a processor;
in which the processor is configured with the memory and program instructions to cause the apparatus to at least:
determine a ratio of uplink radio resources to downlink radio resources using a predetermined parameter;
map an uplink radio resource to a unique one of the downlink radio resources dependent at least in part on the ratio, wherein the uplink radio resource is a resource over which the apparatus sends its transmission and the unique one of the downlink radio resources is a resource for transmitting a reply to the transmission sent over the uplink radio resource, and wherein mapping the uplink radio resource to a unique one of the downlink radio resources comprises determining an index of a downlink physical hybrid automatic repeat request indicator channel based at least in part on a physical resource block index of the transmission sent over the uplink radio resource and on the ratio; and receive on the mapped unique one of the downlink radio resources a reply to an uplink transmission on the uplink radio resource, wherein the reply informs whether or not the uplink transmission on the uplink radio resource was successfully received.

9. The apparatus of claim 8, wherein the predetermined parameter is received on a broadcast channel using two bits.

10. The apparatus of claim 8, wherein the downlink radio resources are physical resource blocks on a physical hybrid automatic repeat request indicator channel; and the reply comprises one of an acknowledgement or a negative acknowledgement to the uplink radio resource.

11. The apparatus of claim 8, wherein the predetermined parameter is a first parameter and the processor is configured with the memory and program instructions to cause the apparatus to map the uplink radio resource to the unique one of the downlink radio resources by mapping the uplink radio resource to a physical hybrid automatic repeat request indicator channel resource using the first parameter and thereafter to determine the unique one of the downlink radio resources by offsetting from the physical hybrid automatic repeat request indicator channel resource by an amount determined from a second parameter that is received on a control channel.

12. The apparatus of claim 11, wherein if the first parameter is X and the uplink resource is indicated as an index to a physical resource block, then the processor is configured with the memory and program instructions to cause the apparatus to map by indentifying the hybrid automatic repeat request indicator channel resource as:

⌊PRB_index1/X⌋ for the case where the total number of uplink radio resources divided by the number of downlink radio resources is an integer; or ⌊(PRB_index1−a)/X⌋ for the case where the total number of uplink radio resources divided by the number of downlink radio resources is not an integer and the term "a" is a positive integer to make the equation an integer, wherein the operator ⌊ ⌋ indicates a flooring operation, and wherein PRB_index1 indicates the lowest physical resource block index allocated to a given user equipment.

13. The apparatus of claim 11, wherein the second parameter comprises a cyclic shift of a demodulation reference signal that is received with an uplink resource allocation.

14. The apparatus of claim 11, where the second parameter comprises an index modifier, where the index modifier is used for mapping the uplink radio resource.

15. A non-transitory memory embodying a program of machine-readable instructions, executable by a digital data processor, to perform actions directed to configure an apparatus to map a downlink radio resource to a related uplink radio resource, the actions comprising:

using a predetermined parameter to determine a ratio of uplink radio resources to downlink radio resources;

mapping an uplink radio resource to a unique one of the downlink radio resources dependent at least in part on the ratio, wherein the uplink radio resource is a resource over which the apparatus sends its transmission and the unique one of the downlink radio resources is a resource for transmitting a reply to the transmission sent over the uplink radio resource, and wherein mapping the uplink radio resource to a unique one of the downlink radio resources comprises determining an index of a downlink physical hybrid automatic repeat request indicator channel based at least in part on a physical resource block index of the transmission sent over the uplink radio resource and on the ratio; and receiving on the mapped unique one of the downlink radio resources a reply to an uplink transmission on the uplink radio resource, wherein the reply informs whether or not the uplink transmission on the uplink radio resource was successfully received.

16. The non-transitory memory of claim 15, wherein the predetermined parameter is received on a broadcast channel using two bits.

17. A method comprising:

receiving a transmission from a user equipment on an uplink radio resource;

using a predetermined parameter to determine by an apparatus a ratio of uplink radio resources to downlink radio resources;

mapping the uplink radio resource to a unique one of the downlink radio resources dependent at least in part on the ratio, wherein the uplink radio resource is a resource over which the user equipment sends its transmission and the unique one of the downlink radio resources is a resource for transmitting a reply to the transmission sent over the uplink radio resource, and wherein mapping the uplink radio resource to a unique one of the downlink radio resources comprises determining an index of a downlink physical hybrid automatic repeat request indicator channel based at least in part on a physical resource block index of the transmission sent over the uplink radio resource and on the ratio; and sending on the mapped unique one of the downlink radio resources a reply to the transmission received on the uplink radio resource, wherein the reply informs whether or not the transmission received on the uplink radio resource was successfully received.

18. The method of claim 17, further comprising broadcasting the predetermined parameter using two bits.

19. The method of claim 17, wherein the downlink radio resources are physical resource blocks on a physical hybrid automatic repeat request indicator channel and the reply is one of an acknowledgement or a negative acknowledgement.

20. The method of claim 17, wherein the predetermined parameter is a first parameter and mapping the uplink radio resource to the unique one of the downlink radio resources comprises:

mapping the uplink radio resource to a physical hybrid automatic repeat request indicator channel resource using the first parameter; and thereafter determining the unique one of the downlink radio resources by offsetting from the physical hybrid automatic repeat request indicator channel resource by an amount determined from a second parameter that is transmitted on a control channel.

21. The method of claim 20, wherein if the first parameter is X and the uplink resource is indicated as an index to a physical resource block, then mapping comprises indentifying the hybrid automatic repeat request indicator channel resource as:

⌊PRB_index1/X⌋ for the case where the total number of uplink radio resources divided by the number of downlink radio resources is an integer; or ⌊(PRB_index1−a)/X⌋ for the case where the total number of uplink radio resources divided by the number of downlink radio resources is not an integer and the term "a" is a positive integer to make the equation an integer, Wherein the operator ⌊ ⌋ indicates a flooring operation, and wherein PRB_index1 indicates the lowest physical resource block index allocated to a given user equipment.

22. The method of claim 20, wherein the second parameter comprises a cyclic shift of a demodulation reference signal that is transmitted with an uplink resource allocation on the control channel.

23. The method of claim 20, where the second parameter comprises an index modifier, where the index modifier is used for mapping the uplink radio resource.

24. An apparatus comprising:
a memory storing program instructions; and
a processor;
in which the processor is configured with the memory and program instructions to cause the apparatus to at least:
receive a transmission from a user equipment on an uplink radio resource;
determine a ratio of uplink radio resources to downlink radio resources using a predetermined parameter;
map the uplink radio resource to a unique one of the downlink radio resources dependent at least in part on the ratio, wherein the uplink radio resource is a resource over which the user equipment sends its transmission and the unique one of the downlink radio resources is a resource for transmitting a reply to the transmission sent over the uplink radio resource, and wherein mapping the uplink radio resource to a unique one of the downlink radio resources comprises determining an index of a downlink physical hybrid automatic repeat request indicator channel based at least in part on a physical resource block index of the transmission sent over the uplink radio resource and on the ratio; and
send on the mapped unique one of the downlink radio resources a reply to the transmission received on the uplink radio resource, wherein the reply informs whether or not the transmission received on the uplink radio resource was successfully received.

25. The apparatus of claim 24, further comprising a transmitter configured to send the predetermined parameter on a broadcast channel using two bits.

26. The apparatus of claim 24, wherein the downlink radio resources are physical resource blocks on a physical hybrid automatic repeat request indicator channel, and the reply comprises one of an acknowledgement or a negative acknowledgement for the received transmission.

27. The apparatus of claim 24, wherein the predetermined parameter is a first parameter and the processor is configured with the memory and program instructions to cause the apparatus to map the uplink radio resource to the unique one of the downlink radio resources by mapping the uplink radio resource to a physical hybrid automatic repeat request indicator channel resource using the first parameter and thereafter to determine the unique one of the downlink radio resources by offsetting from the physical hybrid automatic repeat request indicator channel resource by an amount determined from a second parameter that is transmitted on a control channel.

28. The apparatus of claim 27, wherein the first parameter is X and the uplink resource is indicated as an index to a physical resource block, then the processor is configured with the memory and program instructions to cause the apparatus to map by identifying the hybrid automatic repeat request indicator channel resource as:

$\lfloor PRB\_index1/X \rfloor$ for the case where the total number of uplink radio resources divided by the number of downlink radio resources is an integer; or $\lfloor (PRB\_index1-a)/X \rfloor$ for the case where the total number of uplink radio resources divided by the number of downlink radio resources is not an integer and the term "a" is a positive integer to make the equation an integer, wherein the operator $\lfloor \ \rfloor$ indicates indicates a flooring operation, and wherein PRB_index1 indicates the lowest physical resource block index allocated to a given user equipment.

29. The apparatus of claim 27, wherein the second parameter comprises a cyclic shift of a demodulation reference signal that is transmitted with an uplink resource allocation.

30. The apparatus of claim 27, where the second parameter comprises an index modifier, where the index modifier is used for mapping the uplink radio resource.

31. A non-transitory memory embodying a program of machine-readable instructions, executable by a digital data processor, to configure an apparatus to perform actions directed to map a downlink radio resource to a related uplink radio resource, the actions comprising:
using a predetermined parameter to determine a ratio of uplink radio resources to downlink radio resources;
mapping an uplink radio resource to a unique one of the downlink radio resources dependent at least in part on the ratio, wherein the uplink radio resources are resources allocated to the apparatus and the unique one of the downlink radio resources is a resource allocated for transmitting to the apparatus replies to transmissions sent by the apparatus on the uplink radio resources, and wherein mapping the uplink radio resource to a unique one of the downlink radio resources comprises determining an index of a downlink physical hybrid automatic repeat request indicator channel based at least in part on a physical resource block index of the transmission sent over the uplink radio resource and on the ratio; and
sending on the mapped unique one of the downlink radio resources a reply to an uplink transmission on the uplink radio resource, wherein the reply informs whether or not the uplink transmission on the uplink radio resource was successfully received.

32. The non-transitory memory of claim 31, wherein the predetermined parameter is sent on a broadcast channel using two bits.

* * * * *

UNITED STATES PATENT AND TRADEMARK OFFICE
CERTIFICATE OF CORRECTION

| | | |
|---|---|---|
| PATENT NO. | : 8,559,381 B2 | Page 1 of 1 |
| APPLICATION NO. | : 12/349683 | |
| DATED | : October 15, 2013 | |
| INVENTOR(S) | : Jussi Ojala, Frank Frederiksen and Esa Malkamaki | |

It is certified that error appears in the above-identified patent and that said Letters Patent is hereby corrected as shown below:

IN THE CLAIMS:

In Claim 5, Column 16, line 28, delete "indentifying" and replace with --identifying--.

In Claim 12, Column 17, line 28, delete "indentifying" and replace with --identifying--.

In Claim 21, Column 18, line 51, delete "indentifying" and replace with --identifying--.

In Claim 28, Column 20, line 12, after "[ ]" delete "indicates", as it appears in the Amendment filed December 14, 2012.

Signed and Sealed this
Twenty-eighth Day of January, 2014

Michelle K. Lee
*Deputy Director of the United States Patent and Trademark Office*